United States Patent
Fenchel et al.

(10) Patent No.: US 8,337,189 B2
(45) Date of Patent: Dec. 25, 2012

(54) CONTINUOUS CASTING DEVICE FOR PRODUCING PELLETS FROM PLASTIC MATERIAL AND METHOD FOR OPERATING THE SAME

(75) Inventors: Sven Fenchel, Babenhausen/Langstadt (DE); Jochen Scheurich, Niedernberg (DE)

(73) Assignee: Automatik Plastics Machinery GmbH, Grossotheim (DE)

( * ) Notice: Subject to any disclaimer, the term of this patent is extended or adjusted under 35 U.S.C. 154(b) by 135 days.

(21) Appl. No.: 12/738,730

(22) PCT Filed: Oct. 15, 2008

(86) PCT No.: PCT/EP2008/008728
§ 371 (c)(1),
(2), (4) Date: Jun. 30, 2010

(87) PCT Pub. No.: WO2009/052979
PCT Pub. Date: Apr. 30, 2009

(65) Prior Publication Data
US 2011/0121483 A1 May 26, 2011

(30) Foreign Application Priority Data
Oct. 23, 2007 (DE) .................. 10 2007 050 592

(51) Int. Cl.
*B29B 9/06* (2006.01)
(52) U.S. Cl. ........ 425/315; 425/292; 425/307; 425/308; 425/313; 425/377; 264/143; 264/148; 198/371.2; 198/457.01; 198/618; 83/436.6; 83/661
(58) Field of Classification Search .............. 425/292, 425/307, 308, 313, 315, 377, 378.1, 384, 425/818, 69, 71, 104, 106, 445, DIG. 230, 425/DIG. 108; 264/140, 141, 142, 143, 144, 264/145, 148, 151, 178 R, 237; 83/404, 83/404.1, 421, 436.6, 444, 446, 661; 198/371.1, 198/372.2, 457.01, 618
See application file for complete search history.

(56) References Cited

U.S. PATENT DOCUMENTS
2,887,725 A * 5/1959 Vickers et al. ................ 264/141
(Continued)

FOREIGN PATENT DOCUMENTS
DE 861 83 93.1 8/1986
(Continued)

OTHER PUBLICATIONS
International Preliminary Report on Patentability in related application No. PCT/EP2008/008728 mailed Apr. 27, 2010.
(Continued)

*Primary Examiner* — Joseph Del Sole
*Assistant Examiner* — Seyed Masoud Malekzadeh
(74) *Attorney, Agent, or Firm* — Pillsbury Winthrop Shaw Pittmam LLP

(57) ABSTRACT

The invention relates to a device for producing pellets from plastic material or from material to be pelletized. Said device comprises a continuous casting device (1) from which at least one strand (2) of the material to be pelletized is issued, and a belt conveyor (3) comprising at least one conveying belt (4) on which the strand (2) can be fed to a pelletizer (5), said pelletizer breaking the strand up into pellets (6). The invention is characterized in that the belt conveyor (3) has a switchable direction of conveyance of the conveying belt (4), a direction of feed conveyance towards the pelletizer (5) and a direction of discharge conveyance away from the pelletizer (5). The invention also relates to a method for operating said device.

10 Claims, 1 Drawing Sheet

U.S. PATENT DOCUMENTS

| | | | | |
|---|---|---|---|---|
| 2,975,483 A | * | 3/1961 | Duncan et al. | 264/143 |
| 3,076,999 A | * | 2/1963 | Washburn | 425/316 |
| 3,734,415 A | * | 5/1973 | Franz et al. | 241/65 |
| 3,837,781 A | * | 9/1974 | Lambertus | 425/308 |
| 3,847,535 A | * | 11/1974 | Cahoon et al. | 425/291 |
| 4,025,252 A | * | 5/1977 | Hunke | 425/67 |
| 4,088,727 A | * | 5/1978 | Elliott | 264/130 |
| 4,180,539 A | * | 12/1979 | Clarke | 264/143 |
| 4,340,342 A | * | 7/1982 | Kim | 425/72.1 |
| 4,528,157 A | * | 7/1985 | Lettner et al. | 264/237 |
| 4,632,752 A | * | 12/1986 | Hunke | 210/173 |
| 4,747,767 A | * | 5/1988 | Schnell | 425/311 |
| RE33,492 E | * | 12/1990 | Hunke | 210/173 |
| 5,118,270 A | * | 6/1992 | Keilert et al. | 425/72.1 |
| 5,146,822 A | * | 9/1992 | Noda et al. | 83/22 |
| 5,182,115 A | * | 1/1993 | Nogossek et al. | 425/71 |
| 5,186,959 A | * | 2/1993 | Tanaka | 425/215 |
| 5,242,289 A | * | 9/1993 | Forgash et al. | 425/71 |
| 5,265,507 A | * | 11/1993 | Noda et al. | 83/22 |
| 5,310,515 A | * | 5/1994 | Jurgen et al. | 264/143 |
| 5,441,394 A | * | 8/1995 | Keilert et al. | 425/71 |
| 5,474,435 A | * | 12/1995 | Hunke | 425/71 |
| 5,545,025 A | * | 8/1996 | Tanaka | 425/315 |
| 5,628,947 A | * | 5/1997 | Keilert | 264/143 |
| 5,787,604 A | * | 8/1998 | Kreuz et al. | 34/384 |
| 5,888,554 A | * | 3/1999 | Zollitsch et al. | 425/71 |
| 6,039,905 A | * | 3/2000 | Zollitsch et al. | 264/143 |
| 6,197,355 B1 | * | 3/2001 | Zietlow et al. | 426/289 |
| 6,379,137 B1 | * | 4/2002 | Ecker | 425/71 |
| 6,428,298 B1 | * | 8/2002 | Clauss et al. | 425/71 |
| 6,761,550 B2 | * | 7/2004 | Zietlow et al. | 425/73 |
| 6,905,703 B2 | * | 6/2005 | Rothamel et al. | 424/439 |
| 7,585,443 B2 | * | 9/2009 | Luther | 264/143 |
| 7,828,538 B2 | * | 11/2010 | Fellinger | 425/67 |
| 2004/0130060 A1 | * | 7/2004 | Hammer et al. | 264/209.1 |
| 2005/0062186 A1 | * | 3/2005 | Fellinger | 264/102 |
| 2005/0077644 A1 | * | 4/2005 | Bryan et al. | 264/143 |
| 2006/0202383 A1 | * | 9/2006 | Stundl et al. | 264/211.14 |
| 2007/0152382 A1 | * | 7/2007 | Yamada et al. | 264/628 |
| 2007/0185280 A1 | * | 8/2007 | Luther | 525/356 |
| 2007/0235893 A1 | * | 10/2007 | Miyoshi | 264/105 |

FOREIGN PATENT DOCUMENTS

| | | | |
|---|---|---|---|
| DE | 101 39 324 | | 3/2006 |
| EP | 0 411 536 | | 2/1991 |
| JP | 61189908 A | * | 8/1986 |
| JP | 63118395 A | * | 5/1988 |
| JP | 04069211 A | * | 3/1992 |
| JP | 05212721 A | * | 8/1993 |

OTHER PUBLICATIONS

International Search Report in Application PCT/EP2008/008728 mailed Nov. 12, 2008.

* cited by examiner

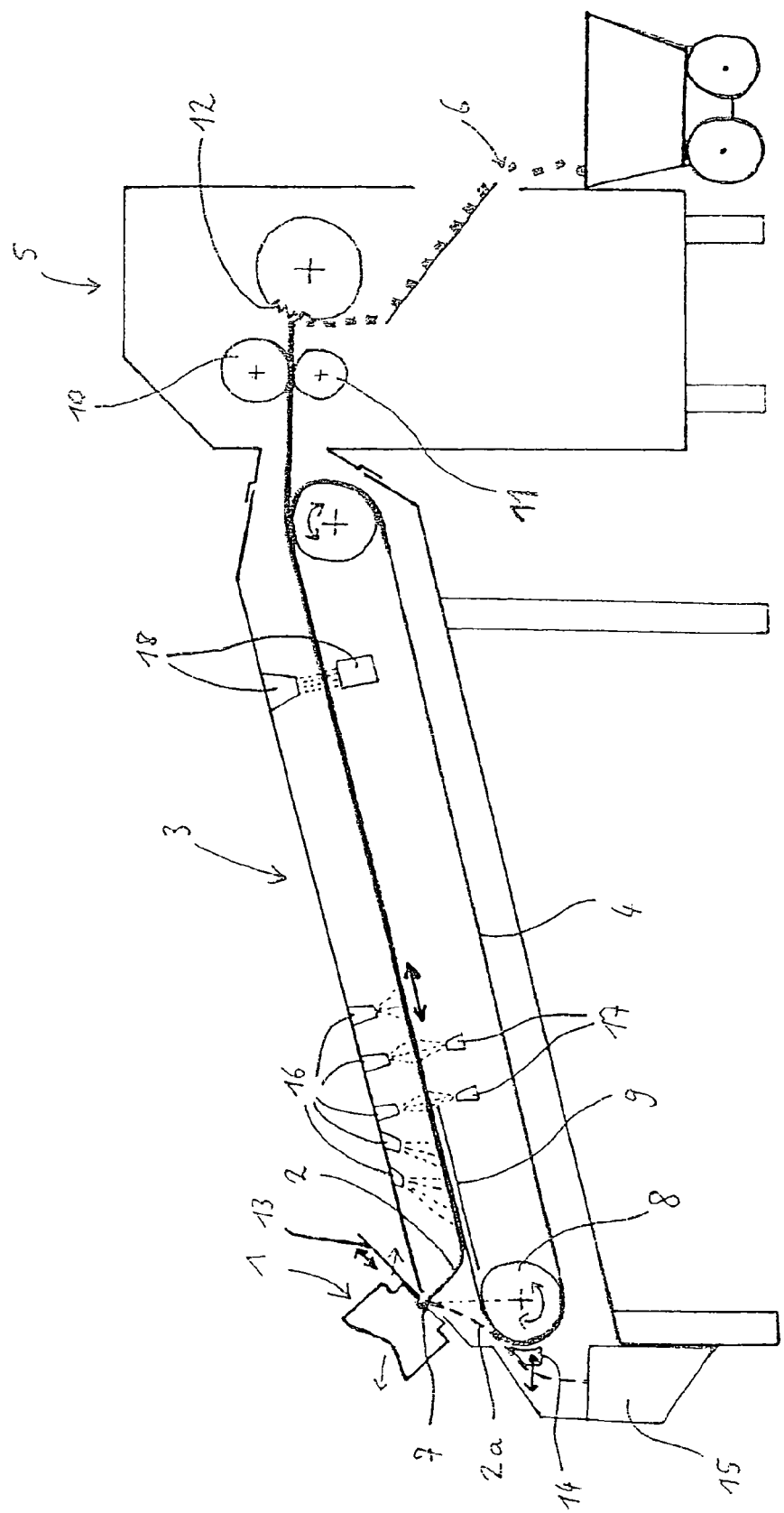

CONTINUOUS CASTING DEVICE FOR PRODUCING PELLETS FROM PLASTIC MATERIAL AND METHOD FOR OPERATING THE SAME

CROSS REFERENCE TO RELATED APPLICATIONS

This application is a U.S. National phase of International Application No. PCT/EP2008/008728, filed Oct. 15, 2008, which in turn claims priority to German Patent Application No. 10 2007 050 592.4, filed on Oct. 23, 2007. The contents of which are incorporated herein by reference in its entirety.

The invention relates to a device for producing pellets from plastic material or from arbitrary material to be pelletized, respectively, having a continuous casting device from which at least one strand of the plastic material is issued and a belt conveyor comprising at least one conveying belt on which the strand is fed to the pelletizing device which breaks up the strand into pellets, according to the preamble of claim 1. The invention also relates to a method for operating such a device.

In general, there is the problem with devices for producing pellets from plastic material or an arbitrary material to be pelletized, respectively, with a continuous casting device that a breakage of the strands can occur in operation, in particular during the start-up process. Therefore, devices and methods which are to be controlled in an extremely complex way and which are subject to a complex surveillance, are required in order to avoid breakage of the strand or recognize it at an early stage and to be able to stop the respective devices if necessary. In particular during the start-up process, the additional problem is encountered that the respective front ends of the strands do not exit quite uniformly from the continuous casting device. At the one hand, it depends on homogeneities eventually still present in the strand material, but also, for example, therefrom that an equilibrium temperature profile could not yet be established and also that an equilibrium between the strand issuance speed from the continuous casting device and the removal speed from the continuous casting device cannot be set up from the beginning. In particular during the start-up process, breakage, undesired inhomogeneities in the strands, undesired superposition of the strands and the like, is particularly easy to occur therefore.

In particular because of the above described problems, an automatic operation, in particular an automatic start-up process of such devices according to the state of the art is made difficult so far or, respectively, an automatic operation of such devices according to the state of the art is not possible in particular during the start-up process.

The German utility model DE 8618393.1 describes a device for cooling and transporting of strands out of thermoplastic materials which are adapted to be melted in an extruder or the like and which, when exciting nozzles of a nozzle had connected to the extruder in a melted state, are adapted to be cooled down on a conveyor belt and are adapted to be conveyed by it to a pelletizer, wherein spraying with a cooling agent is provided on the conveyor path. With this devise described there, for example by varying the speed of the conveyor belt provided therein in feeding direction to the pelletizer, the possibility should be provided to ensure a strand removal guidance which is as reliable as possible and is not influenced by crossing over of the strands, for example from the nozzle head and the strand supply to the extrusion device. Special structural and method features which can further improve in particular the start-up process, are not known from this utility model.

The German disclosure letter DE 10139324 A1 describes a device for use in a plant for pelletizing plastic material which comprises a feeding device rinsed with a cooling liquid for cooling and conveying plastic strands supplied in a melted state to a subsequent pelletizer as well as a guiding device which is adapted to be moved between an operating position and a start-up position such that it takes up the plastic strands in one of the two positions and guides them into a desired direction, whereby, in addition to the device rinsed with cooling liquid and leading to the pelletizer, the so called "production pelletize", a further feeding device rinsed with cooling liquid, is provided which feeds the plastic strands in the start-up phase of the respective system for pelletizing plastic material to a second pelletizer, the so called "waste pelletize". For the adequate guidance of the plastic strands, this system requires, therefore, transportation, feeding and guiding devices which are to be controlled in a complex way and are often required even twofold.

Therefore, it is an object of the present invention, to provide a device and a method for producing pellets from plastic material or from material to be pelletized, respectively, with a continuous casting device which overcomes the deficiencies of the state of the art and which allows, in particular during operation and specially during the start-up process, a reliable operation in an simple and cost effective way, in particular during start-up, whereby especially also a far-reaching automation is possible.

This object achieved according to the invention by a device having the features according to claim 1 as well as by a method having the features of claim 10.

Preferred embodiments are defined in the respective sub claims.

The inventive device serves for producing pellets from plastic material or from material to be pelletized, respectively, with a continuous casting device from which at least one strand of the material to be pelletized is issued, and a belt conveyor comprising at least one conveying belt on which the strand can be fed to a pelletizer which breaks up the strands into pellets. According to the invention, the belt conveyor comprises a switchable direction of conveyance of the conveyor belt, a direction of feed conveyance towards the pelletizer and a direction of discharge conveyance away from the pelletizer.

By means of the inventive arrangement having a belt conveyor switchably operable in its direction, the inventive device for producing pellets is adapted to allow a reliable operation, in particular during the start-up of the device, in a relatively simple and cost effective way. Furthermore, also a far-reaching automation of the operation, in particular also during start-up of the device, can be achieved thereby according to the invention. Therein, the complex devices, controls and surveillance devices according to the state of the art, can be avoiding to a large extend.

Therefore, the invention can allow an automated and reliable pelletizing of various materials, in particular plastic materials. Therein, a big advantage can reside in the simple and yet automatic operation of the device. The inventive device may for example be used with highly filled plastic compounds and plastic materials sensitive to tension as well as with recycling processes which result in frequent breakages of the strands with conventional pelletizing methods.

Preferably, any material to be pelletized is for example to be understood by the term plastic material also according to the invention. Application areas or base materials, respectively, may be: thermoplastics, thermosetting plastics, elastomers, biopolymers (plastic materials biologically decomposable), antioxidants, oleo-chemicals, for example fatty acids and glycerins, alcohols and metal soaps, tensides and lubrication agents, for example PE and PP wax agents, meltable adhesives and resins (for example on the basis of PP, SAN) melt-like polymers, oligomers and low molecular polymers, dying agents based on plastic materials, chemicals, pharmaceutical products, ceramic slurry, composition by polysaccharides (allignat, agar, carrageen, starch) and further materials which are suited for strand pelletizing.

According to the invention, the belt conveyor can be switchable forwards into a production direction, i.e. into a feeding direction of conveyance to the pelletizer and backwards, i.e. against the production direction into a direction of discharge conveyance away from the pelletizer into a direction to a waste position according to the invention. Therein, the backwards operation can serve to convey the material, in case the production operation is undesired, into a waste position and, upon switching into the forward operation, to convey the material into the pelletizer for producing pellets, therein the device is, thereby, adapted to be operated automatically.

According to the invention, a reliable operation can preferably be assured in particular upon start-up in a simple way if the continuous plastic device is arranged with at least one strand outlet opening perpendicular or essentially perpendicular above the first belt roller of the conveyor device or is arranged slightly offset behind the first belt roller as seen in the direction of discharge conveyance. The respective adjustability ensures that an optimal conveyance of the at least one strand can be assured according to the invention in a particularly reliable way in each of the two directions of conveyance.

In order to ensure an optimal cooling effect and, thereby, a particular a reliable and continuous strand guidance depending on the strand material, by which a breakage of a strand may be set up for example by setting up a certain strand temperature, in particular a strand temperature on the surface of the strand, spraying nozzles for a cooling fluid are provided at the upper side and/or the lower side of the conveyor belt. In particular, the conveyor belt may consist of a mesh out of a suitable material such that the cooling fluid also has an optimum contact to the at least one strand.

In order to further, in particular mechanically, stabilize the deposition of the strands on the belt conveyor according to the invention in a simple and cost effective way and in order to be able to avoid thereby a mingling or breakage of the strands, a trough area is provided below the conveyor belt at least in a deposition area of the belt conveyor where the strand which is issued from the continuous casting device, is deposited on the conveyor belt, wherein the spraying nozzles can preferably be arranged in the deposition area or directed to the deposition area. Thereby, a particularly good cooling and/or mechanical guidance of the strands or the at least one strand, respectively, is advantageously made possible in particular in the critical area of the deposition of the strands on the inventive belt conveyor.

Depending on the material used, it may be particularly advantageous that a suction and/or blower device is provided for sucking off and/or blowing off the cooling fluid from the strand, where these devices are preferable provided in the area immediately in front of the pelletizer.

In order to be able to avoid in a simple manner during the start-up process that surplus melted material can exit from the continuous casting device, a breaking device can be provided for breaking up the at least one strand in the area of the strand discharge opening.

In order to avoid adhesion of the strands in the operation in switched direction of conveyance away from the pelletizer, i.e. into the waste direction, a lift-off device can be provided for the at least one strand which may be moved with respect to the conveyor belt of the belt conveyor such that the strands are lifted off the conveyor belt during operation of the conveyor belt in the direction of discharge conveyance.

Preferably, the strand may be taken up by a strand pick-up container also in the operation of the conveyor belt in the direction of discharge conveyance.

In order to be able to provide a far-reaching adaptation to various material strands to be pelletized, the height and/or inclination of the belt conveyor may be adjustable.

The inventive method for operating a device for producing pellets out of plastic material or out of material to be pelletized, respectively, comprising the following steps: producing at least one strand from of plastic material or material to be pelletized, respectively, by means of continuous casting; feeding the strand to a pelletizer by means of a belt conveyor having at least one conveyor belt; breaking up the strands into pellets by means of the pelletizer; wherein, during a start-up face or at least during a start-up face, respectively, the direction of conveyance of the conveyor belt of the belt conveyor is switched from a direction of feed conveyance to the pelletizer into a direction of discharge conveyance away from the pelletizer. In case of a stationary conveyor operation, the direction of conveyance is than (again) set to the direction of feed conveyance to the pelletizer.

In order to be able to allow a particularly simple, cost effective and reliable adjustability for the operation of the device in the inventive method, in particular an adaptation to various materials in order to avoid breaking of the strand, a feeding speed of the conveyor belt, an extrusion speed of the at least one strand and a feeding speed of the pelletizer may be set up individually or collectively such that a specifically adjustable elongation or compression of the plastic material or the material of the strand to be pelletized, respectively, is effected.

According to the invention, a feeding speed of the conveyor belt, an extrusion speed of the strand and a feeding speed of the pelletizer can preferably be adjusted individually or in common such that a start-up or stopping of the method can take place without clots being encountered by piling up of the plastic material or the material to be pelletized, respectively, in the area of the belt conveyor and the pelletizer. The feeding and discharging of the material can preferably be adjusted in all areas of the inventive device according to the method of the invention by a corresponding control of the method being preferred according to the invention.

It is noted in general that all features of the invention which are described above in connection with the inventive device are also valid correspondingly in connection with the method of the invention and vice-versa.

A typical application of the invention would for example be as follows. Several strands, for example out of plastic material, are extruded in parallel with defined distances from the continuous casting device onto the conveyor belt. During this procedure, the direction of conveyance of the belt is set backwards in direction of discharge conveyance away from the pelletizer, i.e. against the production direction, whereby the extruded strands are conveyed in the direction to the waste position below the casting head of the continuous casting device. An application of cooling fluid, preferably for example water or a gaseous cooling fluid, is arranged such that the strands are cooled already upon hitting the conveyor belt, and that an eventual adhesion of the strands on the conveyor belt is avoided. When the inventive device is switched to the production operation, i.e. for running in forward direction, i.e. in the direction of feed conveyance to the pelletizer, the breaking device which can preferable be controlled automatically, breaks the plastic strands in the area of the strand output opening, and the belt conveyor switches its running direction to forward operation. The strands are now carried along on the upper portion of the conveyor belt and they are impinged by a cooling fluid. The length of the belt and the amount and the temperature of the cooling fluid depend on the required cooling properties. Preferably, the material to be pelletized should be cuttable and should not tend to adhere anymore. The cooling fluid adhering to the strands and to the conveyor belt is sucked off or blown off by means of a sucking and/or blowing device preferably in the last partial portion of the belt or in the area in front of the pelletizer, respectively. Thereafter, the strands leave the belt and reach a subsequent transition channel where the strands are conveyed and drawn into a pick-up device of a pelletizer.

In case of a disturbance of the process, the disturbance for example the breaking of a strand can be detected by means of additional detection devices such as light barriers, and an automatic scraping device can be operated where the conveyor belt automatically switches to the backwards operation in order to move the strand material to the waste position. After removal of the disturbance, one can switch again into the position operation state.

The invention is described by way of example in the following with reference to the single FIG. 1.

FIG. 1 shows in side view, as an example, a device for producing pellets from a material to be pelletized with a continuous casting device according to a preferred embodiment of the invention.

At least one strand 2 of the plastic material is issued from the continuous casting device 1. By means of a belt conveyor 3 having at least one conveyor belt 4, the strand 2 may be fed to a pelletizer 5 which breaks up the strand 2 into pellets 6. As indicated by corresponding arrows in FIG. 1, the belt conveyor 3 comprises, according to the invention, a switchable direction of conveyance of the conveyor belt 4 with a direction of feed conveyance to the pelletizer 5 and with a direction of discharge conveyance away from the pelletizer 5. The continuous casting device 1 is provided with at least one strand output opening 7 perpendicular or essential perpendicular above the belt roller 8 of the belt conveyor 3 or is offset behind the first belt roller 8 as seen in the direction of discharge conveyance. The respective adjustability to the left or to the right, respectively, is indicated in FIG. 1 by the perpendicular arrows.

Spraying nozzles 16, 17 are provided for a cooling fluid on the upper side and the lower side 4 of the conveyor belt 4. A trough plate 9 is provided below the conveyor belt 4 at least in the deposition area of the belt conveyor 3 where the strand 2 which is issued from the continuous casting device, is deposited on the conveyor belt 4. The spraying nozzles 16 are at least in part arranged in the deposition area. A sucking and blowing device 18 is provided for sucking and blowing the cooling fluid off the strand 2. A breaking device 13 serves for breaking the strand 2 in the area of the strand output opening 7.

A lift-off device 14 for the strand 2a is provided which is moveable against the conveyor belt 4 such that a lift-off of the strand 2 from the conveyor belt may be effected in case of the operation of the conveyor belt in the direction of discharge conveyance. The strand 2a may be taken up by a strand take-up container 15.

In general, at least the belt conveyor 3 is adjustable in its height and/or inclination. Also the continuous casting device 1 can be adjustable accordingly in its height and also the pelletizer 5 can accordingly be adjustable in its height. Pelletizing of the strand 2 into pellets 6 in the area of the pelletizer 5 is effected by a breaking device 13 known per se using feeding rollers 10, 11.

As can be seen from the embodiment shown in FIG. 1, the complete system is essentially sealed of against environmental influences. The device is essentially completely surrounded, in particular hermetically surrounded by a sealed housing or by sealed housing portions, respectively, which may be assembled. Therefore, a particularly safe operation can be made possible while environmental influences are avoided to a large extend.

The inventive device or the inventive method, respectively, allow a simple, cost effective and reliable operation, in particular during start-up, whereby a far-reaching automation or even a complete automation is possible according to the invention.

The invention claimed is:

1. A device for producing pellets from a plastic material comprising a continuous casting device configured to issue at least one strand of the plastic material, and a belt conveyor comprising at least one conveying belt on which the strand can be fed to a pelletizer that breaks up the strand into pellets, wherein the belt conveyor has a switchable direction of conveyance of the conveying belt, a direction of feed conveyance towards the pelletizer and a direction of discharge conveyance away from the pelletizer, and further comprising an automatic scraping device configured to operate in a manner such that, in case of a disturbance in an operation of the device, the conveyor belt automatically switches to a backwards operation in order to move a strand material to a waste position.

2. The device according to claim 1, wherein the continuous casting device is arranged with at least one strand output opening perpendicular or essentially perpendicular above a first belt roller of the belt conveyor or somewhat offset behind the first belt roller as viewed in the direction of discharge conveyance.

3. The device according to claim 1, further comprising spraying nozzles are provided for a cooling fluid to be sprayed on an upper side and/or a lower side of the conveyor belt.

4. The device according to claim 3, further comprising, at least in a deposition area of the belt conveyor where the strand issued by the continuous casting device is deposited on the conveyor belt, a trough plate is provided below the conveyor belt, whereby the spraying nozzles are arranged in the deposition area or directed to the deposition area.

5. The device according to claim 3, further comprising a sucking and/or blowing device is provided for sucking and/or blowing the cooling fluid off the strand.

6. The device according to claim 1, further comprising a breaking device for breaking the strand in the area of a strand outlet opening.

7. The device according to claim 1, further comprising a lift-off device for the strand, wherein the lift-off device is moveable against the conveyor belt of the belt conveyor such that a lifting of the strand off the conveyor belt is effected in the operation of the conveyor belt in the direction of discharge conveyance.

8. The device according to claim 1, wherein the strand is adapted to be taken up by a strand take-up container during operation of the conveyor belt in the direction of discharge conveyance.

9. The device according to claim 1, wherein the height and/or inclination of the belt conveyor is adjustable.

10. The device of claim 1, wherein the strand material comprises the strand and/or the pellets.

* * * * *

UNITED STATES PATENT AND TRADEMARK OFFICE
CERTIFICATE OF CORRECTION

PATENT NO. : 8,337,189 B2  
APPLICATION NO. : 12/738730  
DATED : December 25, 2012  
INVENTOR(S) : Sven Fenchel et al.

Page 1 of 1

It is certified that error appears in the above-identified patent and that said Letters Patent is hereby corrected as shown below:

On title page, Item (73) Assignee, Line 2  
      replace "Grossotheim (DE)"  
      with --Grossostheim (DE)--.

Signed and Sealed this  
Twelfth Day of March, 2013

Teresa Stanek Rea  
*Acting Director of the United States Patent and Trademark Office*